United States Patent [19]

Oikawa et al.

[11] Patent Number: 5,324,434
[45] Date of Patent: Jun. 28, 1994

[54] WATER PURIFYING APPARATUS

[75] Inventors: Yukio Oikawa, Handa; Isamu Shigeta, Toyota; Shiro Saito; Mitsuhiro Hayamizu, both of Aichi, all of Japan

[73] Assignees: Nippondenso Co., Ltd., Kariya; Inax Corporation, Tokoname, Japan

[21] Appl. No.: 851,027

[22] Filed: Mar. 13, 1992

[30] Foreign Application Priority Data

Mar. 16, 1991 [JP] Japan ............................... 3-051773
Feb. 29, 1992 [JP] Japan ............................... 4-031743

[51] Int. Cl.5 .................... C02F 1/48; C02F 1/46; B01D 35/06
[52] U.S. Cl. ............................ 210/87; 210/93; 210/95; 210/232; 210/243; 210/266; 210/314; 210/335; 210/500.23; 210/500.27; 210/748; 204/152; 204/302; 361/228; 422/186.06; 239/708
[58] Field of Search ............... 210/243, 748, 764, 335, 210/446, 449, 97, 121, 314, 316, 232, 238, 287, 87, 266, 500.23, 85, 93, 95, 500.27, 508; 361/212, 226, 227, 228; 422/22, 186.06; 239/691, 708; 204/152, 302

[56] References Cited

U.S. PATENT DOCUMENTS

| 3,757,814 | 9/1973 | Hill. | |
|---|---|---|---|
| 3,933,643 | 1/1976 | Colvin | 210/243 |
| 4,540,489 | 9/1985 | Barnard. | |
| 4,886,593 | 12/1989 | Gibbs. | |
| 4,941,962 | 7/1990 | Inoue | 210/243 |
| 4,948,515 | 8/1990 | Okunura | 210/243 |
| 4,986,906 | 1/1991 | Dadisman | 210/243 |
| 4,999,108 | 3/1991 | Koch | 210/243 |
| 5,002,204 | 3/1991 | Sakai | 210/243 |
| 5,007,994 | 4/1991 | Snee | 210/243 |
| 5,068,030 | 11/1991 | Chen | 210/243 |
| 5,089,145 | 2/1992 | Fern | 210/243 |
| 5,114,571 | 5/1992 | Pier | 210/243 |
| 5,118,410 | 6/1992 | Rumberger | 210/243 |

FOREIGN PATENT DOCUMENTS

| 2148846 | 3/1973 | France. |
|---|---|---|
| 57-168566 | 4/1981 | Japan. |
| 59-166892 | 11/1984 | Japan. |
| 61-97093 | 5/1986 | Japan. |
| 61-178990 | 11/1986 | Japan. |
| 61-187298 | 11/1986 | Japan. |
| 199684 | 4/1989 | Japan. |
| 0663540 | 12/1987 | Switzerland. |

*Primary Examiner*—Thomas M. Lithgow
*Attorney, Agent, or Firm*—Cushman, Darby & Cushman

[57] ABSTRACT

A filter of a water purifying apparatus main body which is housed in a sink is made as a positive electrode, and a DC voltage is applied, by a dry battery cell, between the filter and a negative electrode in a purified water passage. Thus, microbes are prevented from proliferating in tap water which remains in the water purifying apparatus main body. A discharge pipe of the water faucet used exclusively for purified water is made as a negative electrode, and a DC voltage is applied, by the dry battery cell, between the positive electrode in the outlet of a cartridge and the discharge pipe. Thus, microbes are prevented from proliferating in tap water which remains in the water faucet used exclusively for purified water.

7 Claims, 7 Drawing Sheets

WATER PURIFYING APPARATUS

BACKGROUND OF THE INVENTION

The present invention relates to a water purifying apparatus and, more particularly, to a water purifying apparatus suitable for use in household.

Water purifying apparatus having a filter inside the main body thereof for removing from tap water fine inorganic and organic substances, and residual chlorine, have been widely used in general households. Since the main body of the water purifying apparatus is mounted on an ordinary water faucet, there is an inconvenience in that a kitchen sink is made smaller. Therefore, to solve such inconvenience, a water purifying apparatus has been proposed in which the main body of the water purifying apparatus is housed in a sink, and tap water is introduced into a sink top of the sink by a water faucet used exclusively for purified water.

However, these is a problem in that, since the tap water which passes through the filter does not contain residual chlorine, microbes, such as bacteria, are likely to proliferate in the tap water which remains in the section from downstream of the filter of the main body of the water purifying apparatus to the discharge outlet of the water faucet used exclusively for purified water.

SUMMARY OF THE INVENTION

An object of the present invention is to provide a water purifying apparatus which prevents microbes from proliferating in the feedwater in which residual chlorine was removed in a filter and a water passage therefrom.

The present invention comprises a filter for removing residual chlorine in the feedwater; a water passage through which the feedwater from which residual chlorine is removed flows; a pair of first electrode means disposed in the filter; a pair of second electrode means disposed in the water passage; and applying means for applying a DC voltage to the pair of first electrode means and the pair of second electrode means.

In the present invention, the proliferation of microbes, such as bacteria, in the feedwater in the filter and the feedwater passage on the downstream side of the filter is prevented by applying a DC voltage to the pair of first electrode means and the pair of second electrode means.

The aforementioned and other objects, features and advantages of the present invention will become clear when reference is made to the following description of the preferred embodiments of the present invention, together with reference to the accompanying drawings.

DESCRIPTION OF THE PREFERRED EMBODIMENTS

A water purifying apparatus of the present invention will be explained below with reference to a first embodiment shown in FIGS. 1A to 6.

Figure 1A:
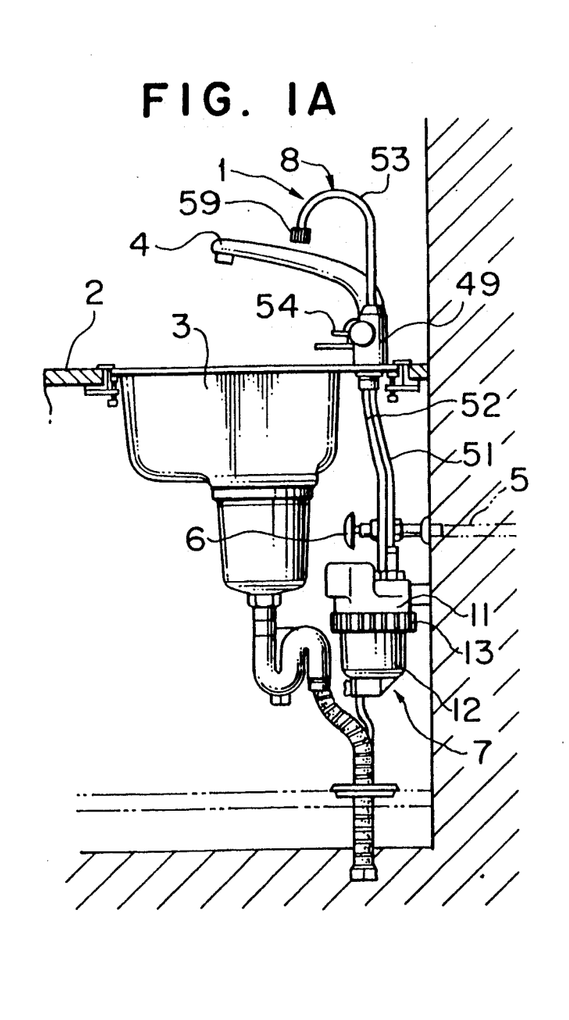
FIG. 1A is a front view of a sink in which a household water purifying apparatus of the present invention is incorporated.
Figure 1B:
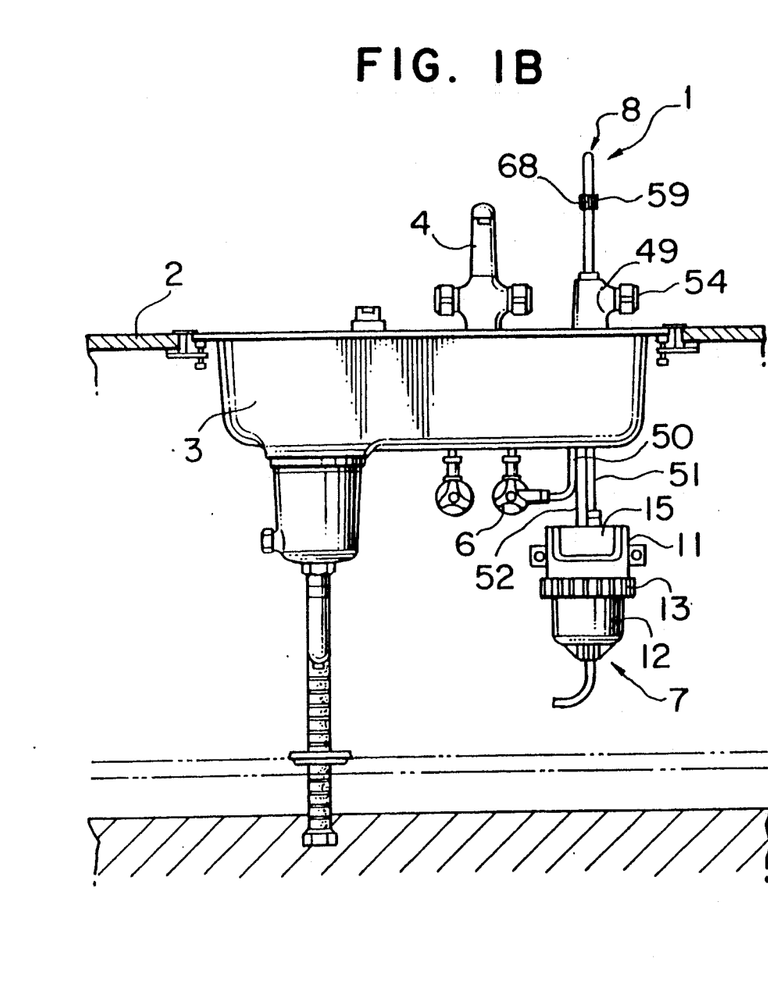
FIG. 1B is a side view of the household water purifying apparatus shown in FIG. 1A.

FIGS. 1A and 1B show a sink in which a household water purifying apparatus is incorporated. A household water purifying apparatus 1 is made to branch by a branch faucet 6 from a feedwater pipe 5 for introducing tap water to a water faucet 4 above a sink top 3 provide in a kitchen sink 2. The household water purifying apparatus 1 comprises a water purifying apparatus main body 7 housed at a location below the sink top 3 inside the sink 2, a water faucet 8 used exclusively for purified water disposed in a projected manner above the water tank 3, and dry battery cells 9 and 10 housed inside the water purifying apparatus main body 7 (see FIG. 2).

Figure 2:
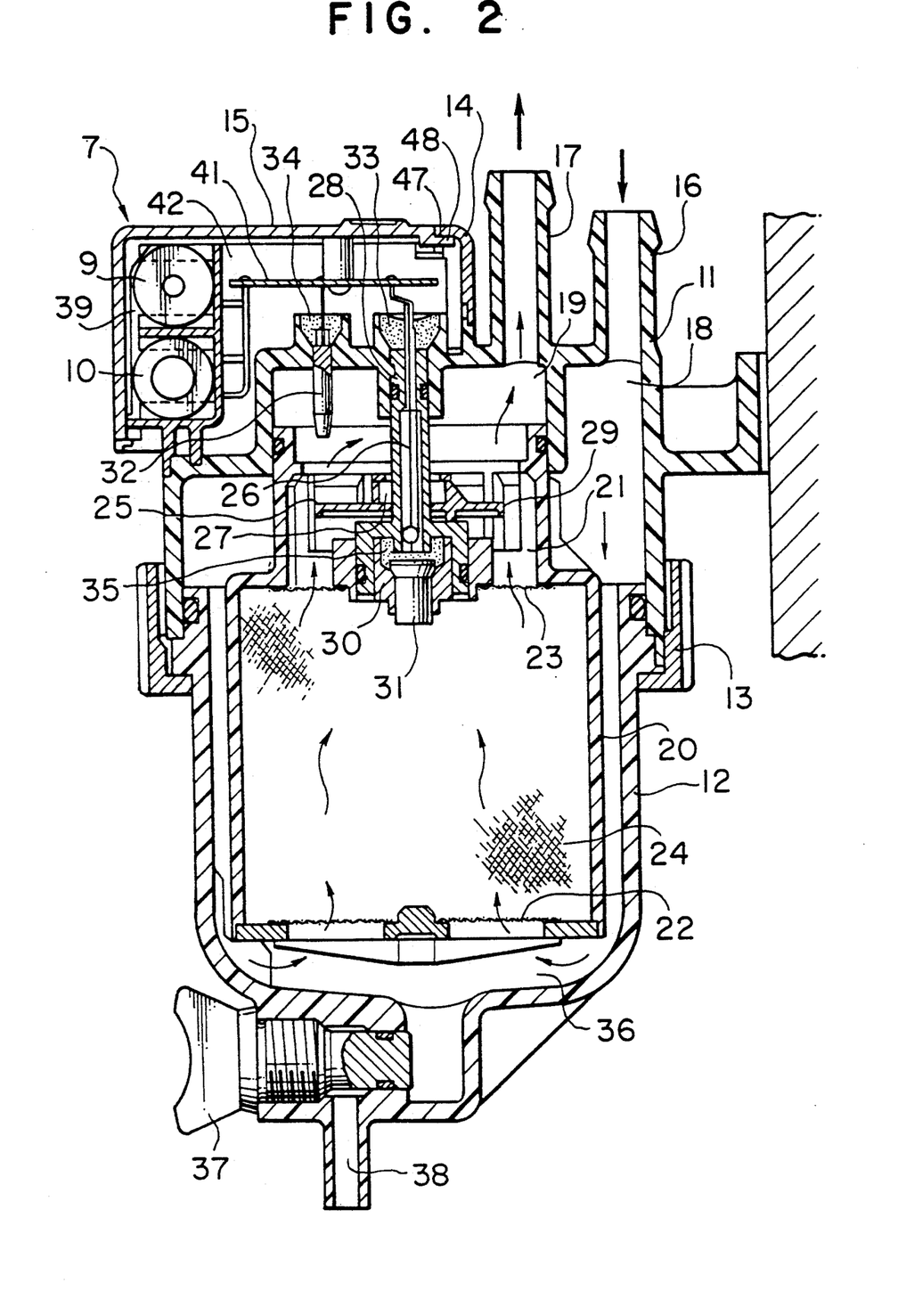
FIG. 2 is an enlarged cross-sectional view of the water purifying apparatus shown in FIGS. 1A and 1B.

The water purifying apparatus main body 7 has a cap 11 fastened to the wall of the sink 2 by a bolt or the like, a casing 12 fitted on the inner circumference of the lower end portion of the cap 11, a cylindrical fastening member 13 for connecting the cap 11 and the casing 12, a housing 14 which is fitted to the upper end portion of the cap 11, and a plate 15 which is releasably mounted on the housing 14.

The cap 11 is formed of a resin, such as polyphenylene sulfide (PPS). The cap 11 is disposed in such a manner that an entry pipe 16 which is connected to the branch faucet 6 and an exit pipe 17 which is connected to the interior of the water faucet 8 are made to project upward. A water passage 18 on a portion where the tap water is caused flow in and a purified water passage 19 on a portion where tap water is caused to flow out to the water faucet 8, are formed in the interior of the cap 11. The upper end portion of a cylindrical cartridge 20 is fitted to a wall which forms the purified water passage 19 of the cap 11.

The cartridge 20, made of a resin of, for example, acrylonitrile-butadiene-styrene copolymer (ABS), forms a purified water passage 21 through which tap water flows. The purified water passages 19 and 21 constitute the water passage of the present invention. Stored inside the cartridge 20 are a mesh 22 made of chemical fibers provided on the portion where the tap water flows in, a mesh 23 made of chemical fibers provided on the portion where the tap water flows out, and an area between the meshes 22 and 23 is filled with an electrically conductive filter 24.

The filter 24 is formed of an active carbon fiber layer (surface area of 1,000 $m^2$/g or above) so as to permit tap water to pass through it. When tap water passes through it, inorganic and organic substances, and residual chlorine contained in the tap water are removed.

The two meshes 22 and 23 prevent the filter from scattering and prevent it from being caused to flow out by the flow of water.

A water-current sensor 25 for detecting whether there is a water current inside the water passage 21 is installed on the inner circumference of the cartridge 20. The water-current sensor 25 comprises a lead switch 26 and a permanent magnet 27. The lead switch 26 is inserted into a cylindrical stay 28 made of a resin of PPS or the like. The upper end portion of the stay 28 is fitted to the inner circumference of the cap 11, and the lower end portion thereof is fitted to the inner circumference of the cartridge 20. The permanent magnet 27 is loaded in a ring-like float 29 made of, for example, a ABS resin. The float 29 is made of a resin of, for example, ABS, and is fitted to the outer circumference of the stay 28 in such a manner as to be slidable in the axial direction of the stay 28. The outer circumference portion of the float 29 faces the interior of the water passage 21 and the float 29 is caused to move by the water current.

A bar-shaped positive electrode 31, made of, for example, carbon, held by a holder 30, is fitted into the interior of the tube of the stay 28 on the lower end side thereof. The positive electrode 31 is placed in such a manner as to contact with the filter 24. A bar-shaped negative electrode 32, made of, for example, aluminum, arranged parallel to the stay 28, is fitted into the upper end portion of the cap 11. The negative electrode 32 is disposed inside the water passage 19 and the water passage 21 of the cartridge 20 in a projected manner from the upper and portion of the cap 11. The positive electrode 31 and the negative electrode 32 constitute a pair of first electrode means of the present invention.

Gaps between the cap 11 and the stay 28, between the cap 11 and the negative electrode 32 and between the holder 30 and the positive electrode 31 are filled with potting agents 33 to 35 to securely fix the above members and preventing leakage of water.

The casing 12 is made of a resin of, for example, nylon (trade mark) and is cylindrical in shape. A water passage 36 for housing the lower end portion of the cartridge 20 and through which tap water flows is formed inside the casing 12. A drain passage 38 which is opened/closed by a cock 37 is connected to the lower end of the water passage 36.

Figure 3:
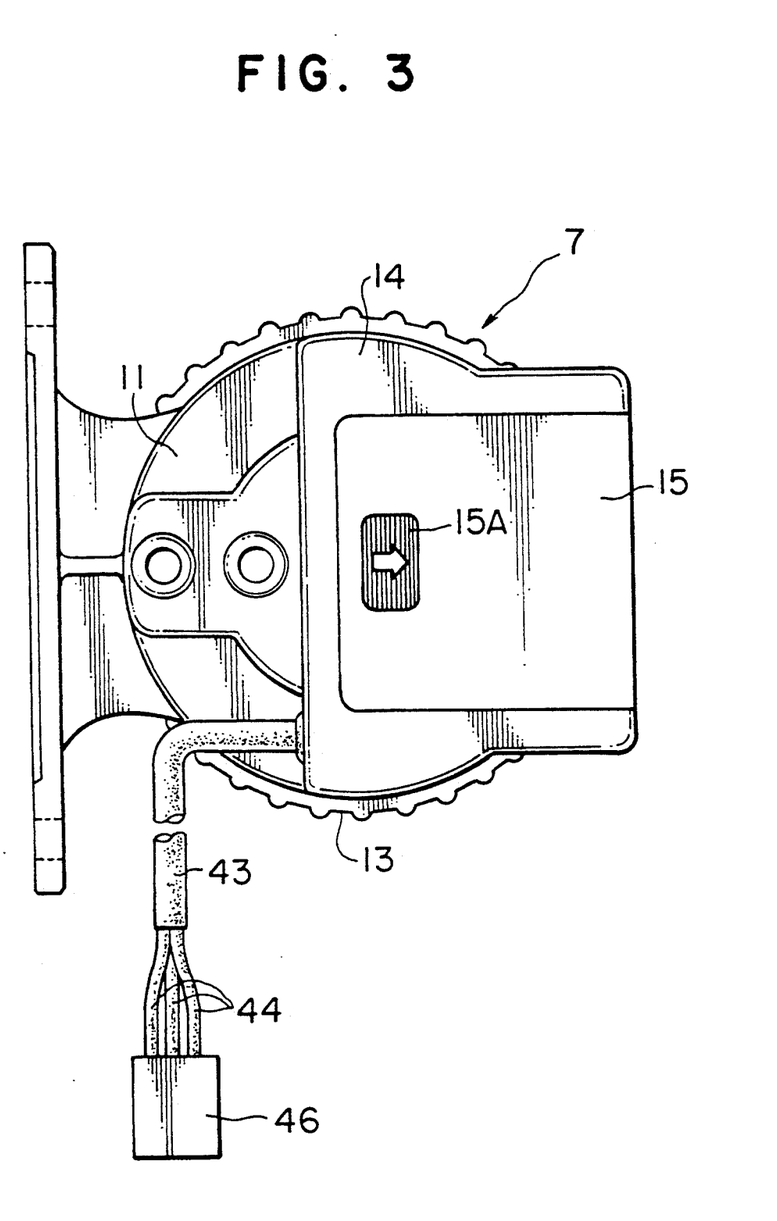
FIG. 3 is a top plan view of the main body of the water purifying apparatus shown in FIG. 2.

The portion surrounded by the upper end portion of the cap 11, the housing 14 and the plate 15 is used as a housing chamber 39 for housing dry battery cells 9 and 10 and as a control chamber 42 for housing a control board 41 on which a control circuit (see FIG. 6) is wired. A plurality of lead wires 44, which are inserted into a tube 43, as shown in FIG. 3, are led out of the housing 14. A connector 46 is connected to the terminals of the lead wires 44.

When the dry battery cells 9 and 10 are to be replaced, the plate 15 is made to slide, as shown in FIG. 3, in the direction of an arrow while a portion 15A of the plate 15 indicated by the arrow is being pressed downward, and a locking claw 48 of the plate 15 is disengaged from a locking section 47 of the housing 14. Thus, after the housing chamber 39 is opened, the dry battery cells 9 and 10 can be replaced.

Figure 4:
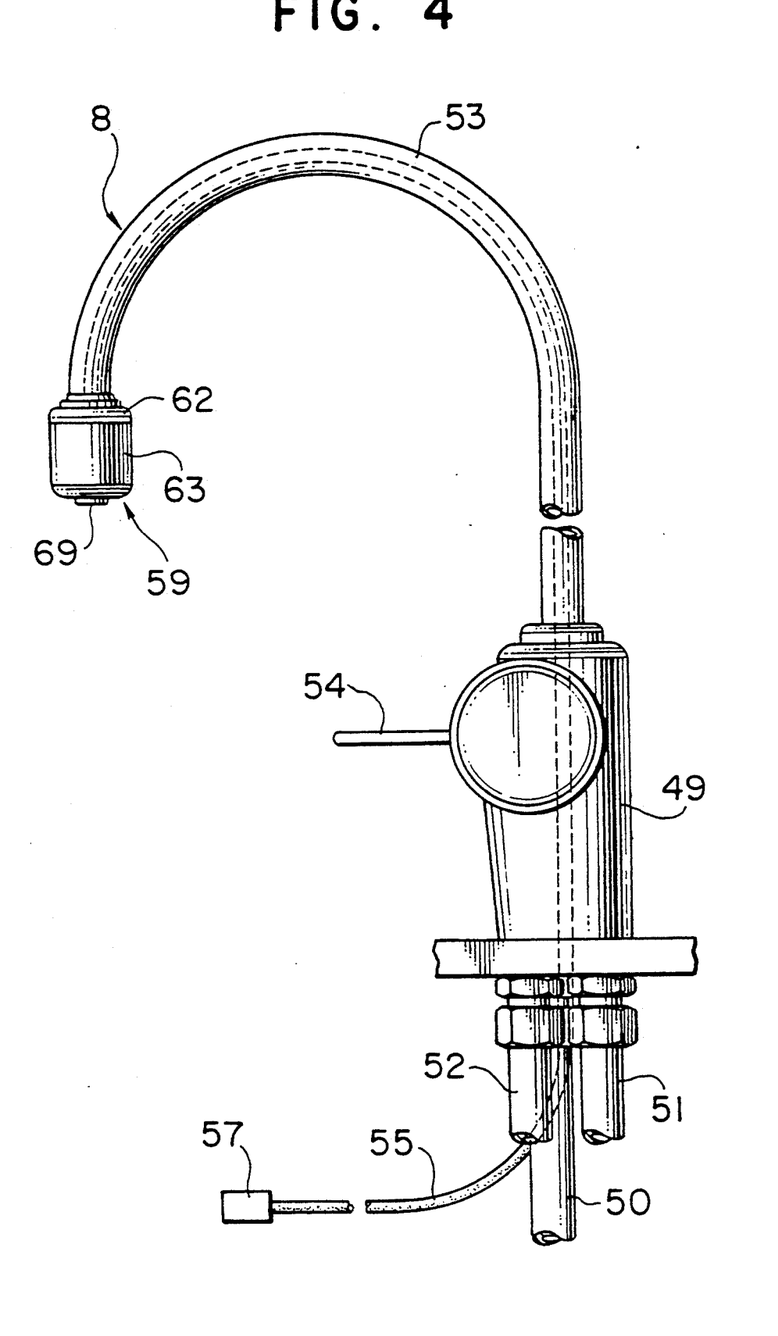
FIG. 4 is an enlarged side view of a water faucet used exclusively for purified water of the water purifying apparatus shown in FIGS. 1A and 1B.

FIG. 4 shows the water faucet 8 used exclusively for purified water.

The water faucet 8 has a water fauset main body 49 fixed to the upper wall of the sink 2, a plurality of connection pipes 50 to 52 disposed downwardly in a projected manner from the water faucet main body 49, and a discharged pipe 53 disposed upwardly in a projected manner from the water faucet main body 49. The discharge pipe 53 forms the feedwater passage of the present invention.

Figure 5:
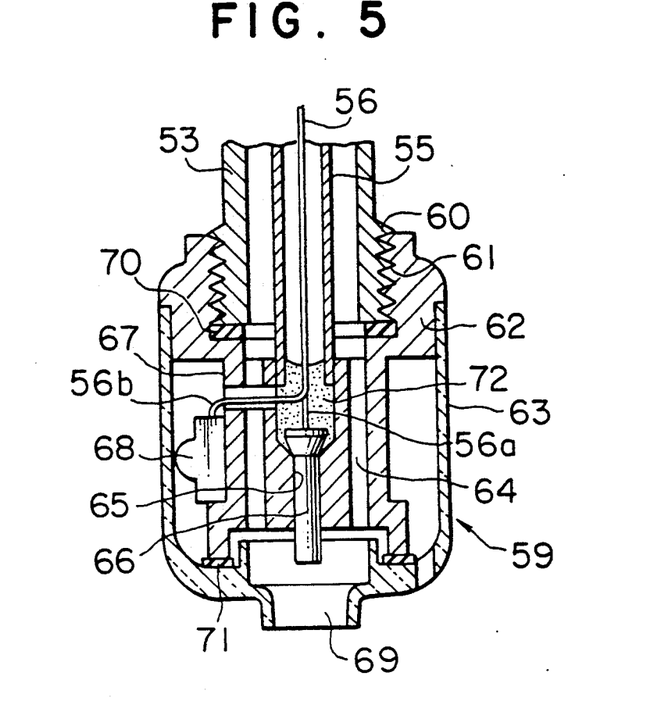
FIG. 5 is a cross-sectional view of a cartridge of the water purifying apparatus shown in FIGS. 1A and 1B.

A main cock 54 which, when it is turned, adjusts how much the plurality of connection pipes 50 to 52 and the discharge pipe 53 are opened, is installed in the water faucet main body 49. When this cock 54 is operated, the tap water flows into the household water purifying apparatus 1. Three wires of a pair of lead wires 56b of positive/negative electrodes, which are inserted into a tube 55 as shown in FIG. 5 and a lead wire 56a on the part of the positive electrode are led out of the lower end portion of the water faucet main body 49. The lead wire 56a of the positive electrode side is connected to a positive electrode 66 which will be described later, and the pair of lead wires 56b of positive/negative electrodes is connected to a light-emitting diode 68 which will be described later. A connector 57, coupled to the connector 46 of the water purifying apparatus main body 7, is connected to the terminal of the lead wire 56.

The connecting pipe 50 is connected to the entry pipe 16 of the water purifying apparatus main body 7 through the branch faucet 6 and the connecting pipe 51, and the connecting pipe 52 is connected to the exit pipe 17 of the water purifying apparatus main body 7 and the discharge pipe 53. The discharge pipe 53 is made of an electrical conductor and bent in the shape of a reverse U. The negative electrode side of the lead wire 56 for the light-emitting diode 68 is electrically parallelly connected to the interior of the discharge pipe. As a result, the discharge pipe 53 forms a negative electrode 58 shown in FIG. 6 in contrast with the positive electrode 66 which will be described later. The positive electrode 66 and the negative electrode 58 constitute a pair of second electrode means of the present invention. The end portion of the main body of the discharge pipe 53 is inserted into a hole (not shown) via which the pipe 53 communicates with the connecting pipe 52 of the water faucet main body 49, and a cartridge 59 is installed in the extreme end portion of the pipe 53.

The cartridge 59 shown in FIG. 5 comprises a cylindrical main body 62, made of an electrically insulating resin, having an inner circumferential screw 61 which engages an outer circumferential screw 60 formed on the outer circumference of the top end portion of the discharge pipe 53, and a transparent resinous cover 63 which is fitted to the outer circumference of the main body 62.

A plurality of discharge outlets 64 through which tap water is discharged is formed in the interior of the main body 62. The bar-shaped positive electrode 66 made of, for example, carbon, which is electrically connected to the above-mentioned lead wire 56 on the side of the positive electrode from among three lead wires inside the tube 55, is fitted to the interior of a through hole 65 in the interior of the discharge outlets 64 of the main body 62. The positive electrode 66 is disposed in a projected manner from the lower end portion of the main body 62. Furthermore, the light-emitting diode 68 which emits light when a DC voltage higher than a predetermined voltage is supplied via the pair of lead wires 56b of the positive/negative electrodes is fixed to the circumferential groove 67 formed on the outer circumference of the main body 62. The light-emitting diode 68 functions as an indicator for dry-cell service life. The light emission of the light-emitting diode 68 is visible to a user through the cover 63 because the cover 63 is made of a transparent resin.

The inner circumference portion of the cover 63 is open for a nozzle 69 for discharging tap water into the water tank 3. Packings 70 and 71 for preventing leakage of water are put between the discharge pipe 53 and the main body 62 and between the main body 62 and cover 63, respectively. The gap between the main body 62 and the positive electrode 66 is filled with a potting agent 72 for fixing the above members and preventing leakage of water.

Figure 6:
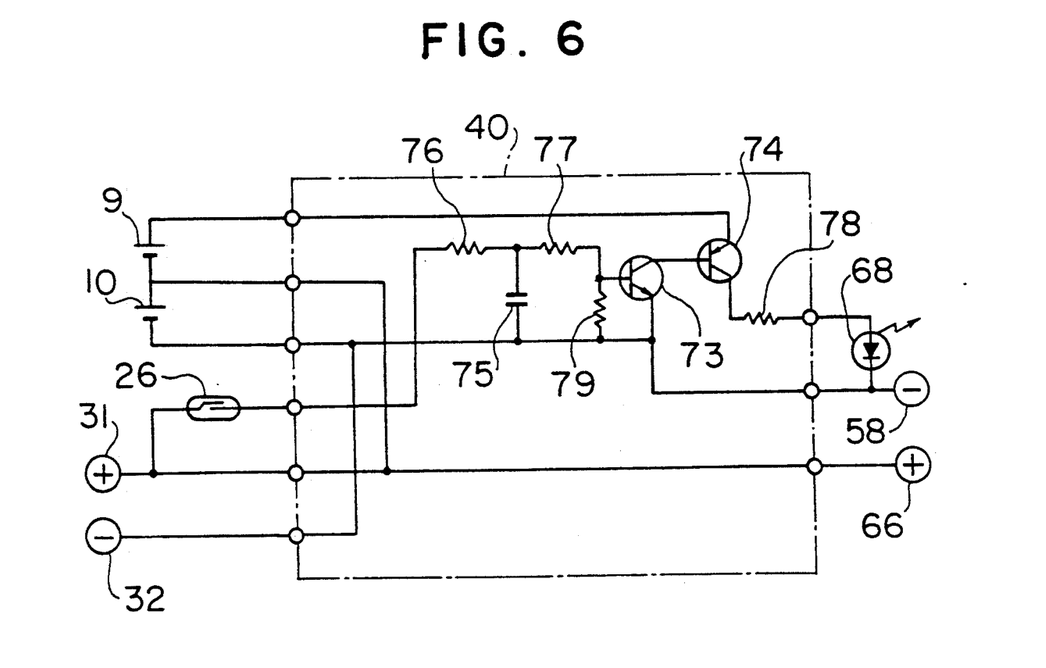
FIG. 6 is an electrical wiring diagram which illustrates a control circuit wired in a control board of the water purifying apparatus shown in FIGS. 1A and 1B.

FIG. 6 is an electrical wiring diagram which illustrates a control circuit 40 wired in a control board 41.

Dry battery cells 9 and 10 form an applying means of the present invention. They apply a DC voltage of 1.5 V between the positive electrode 31 and the negative electrode 32 of the water purifying apparatus main body 7 through the control circuit 40, and apply a DC voltage of 1.5 V between the positive electrode 66 and the negative electrode 58 of the water faucet 8 used exclusively for purified water.

The control circuit 40 comprises, for example, two transistors 73 and 74, a capacitor 75 and four resistors 76 to 79. When the lead switch 26 is closed, the two transistors 73 and 74 are turned on, causing the dry battery cell 9 and the light-emitting diode 68 to conduct. The light-emitting diode 68 is not illuminated even if the lead switch 26 is closed when the DC voltage of the dry battery cell 9 falls below 0.8 V.

The operation of the household water purifying apparatus 1 will now be explained with reference to FIGS. 1A to 6.

When a user turns the cock 54 of the water faucet main body 49 of the water faucet 8 used exclusively for purified water, the connecting pipes 50 and 51 connect to each other, causing tap water to flow into the water purifying apparatus main body 7 from the water passage 18 of the entry pipe 16 of the cap 11.

The tap water which flows into the water purifying apparatus main body 7 passes through the water passage 36 of the casing 12, as indicated by the arrow shown in FIG. 2, and flows into the purified water passage 21 of the cartridge 20. Since the interior of the cartridge 20 is filled with the filter 24 formed of an active carbon fiber layer, inorganic and organic substances, and residual chlorine contained in the tap water are removed.

Then, the purified tap water is discharged into the sink top 3 from the discharge outlet 64 of the cartridge 59 through the connecting pipe 52, the water faucet main body 49 and the discharge pipe 53 after the purified tap water flows out of the water purifying apparatus main body 7 through the purified water passage 19 of the cap 11.

Next, when the user returns the cock 54 of the water faucet main body 49 of the water faucet 8 to its original position, the connecting pipes 50 and 51 are shut off, causing the water flow inside the household water purifying apparatus 1 to be stopped. At this time, the tap water remains in the water purifying apparatus main body 7 and the water faucet 8. The tap water which has passed through the filter 24 has no sterilizing function because residual chlorine has been removed. For this reason, there is a possibility that microbes, such as bacteria, will proliferate in the tap water which remains in a few hours and the tap water will become quite instantary.

Therefore, in the household water purifying apparatus 1, the proliferation of microbes, such as bacteria, in tap water which remains inside the water purifying apparatus main body 7 from the downstream of the filter 24 to the purified water passage 19 is suppressed by bringing the positive electrode into contact with the filter 24 so as to make the entire filter 24 a positive electrode, and applying a DC voltage of 1.5 V by the dry battery cell 10, between the filter 24 and the negative electrode 32 disposed in a projected manner inside the purified water passage 19. In like manner, the proliferation of microbes, such as bacteria, in tap water which remains inside the entire discharge pipe 53 is suppressed by fringing the negative electrode 58 into contact with the discharge pipe 53 of the water faucet 8 so as to make the entire discharge pipe 53 a negative electrode, and applying a DC voltage of 1.5 V by the dry battery cell 10, between the positive electrode 66 disposed in a projected manner inside the nozzle 69 of the cartridge 59 and the discharge pipe 53.

Since an applied voltage effective for suppressing the proliferation of microbes, such as bacteria, is at least 0.8 V, if the DC voltage of the dry battery cell 10 falls below 0.8 V, the user must be notified of this fact. Therefore, in the household water purifying apparatus 1, the water-flow sensor 25 is placed inside the water purifying apparatus main body 7, and the light-emitting diode 68 is mounted on the cartridge 59 of the water faucet 8. Thus, the user is informed of the life of the dry battery cell 10.

This notification method will be explained briefly with reference to FIGS. 2 and 6. If there is a water current inside the purified water passage 21 of the cartridge 20 of the water purifying apparatus main body 7, the float 29 of the water-flow sensor 25 is pushed up in the direction of the arrow shown in the figure. When the float 29 reaches the uppermost point, the lead switch 26 is closed by the magnetic flux of the permanent magnet 27 contained in the float 29.

The closure of the lead switch 26 causes the positive electrical potential of the dry battery cell 10 to be applied to the base of the transistor 73, so the transistor 73 is turned on. The turning-on of the transistor 73 causes the transistor 74 to be turned on. As a result, the DC voltage of the dry battery cell 9 is applied to the light-emitting diode 68, and the light-emitting diode 68 is illuminated. The light-emitting diode 68 is illuminated when the DC voltage of the dry battery cell 10 is above 0.8 V. It is not illuminated even if the water-current sensor 25 means a water current when the DC voltage of the dry battery cell 10 is below 0.8 V As a result, the user can be notified of the end of the life of the dry battery cell 10.

Although in the above-described embodiment the present invention is used as a household water purifying apparatus, the present invention may be used as a business-use water purifying apparatus. Although in this embodiment the present invention is disposed separate from a water faucet, the present invention may be disposed on the side of the water faucet.

Although in this embodiment dry battery cells housed in the water purifying apparatus main body are used as an applying means, commercial AC power supplies and generators may be used as applying means. If a water current inside the water purifying apparatus main body is sensed, supplying of electric current to the positive/negative electrodes (a pair of first electrode means) of the water purifying apparatus main body, and to the positive/negative electrodes (a pair of second electrode means) of the water faucet used exclusively for purified water, may be stopped.

Figure 7:
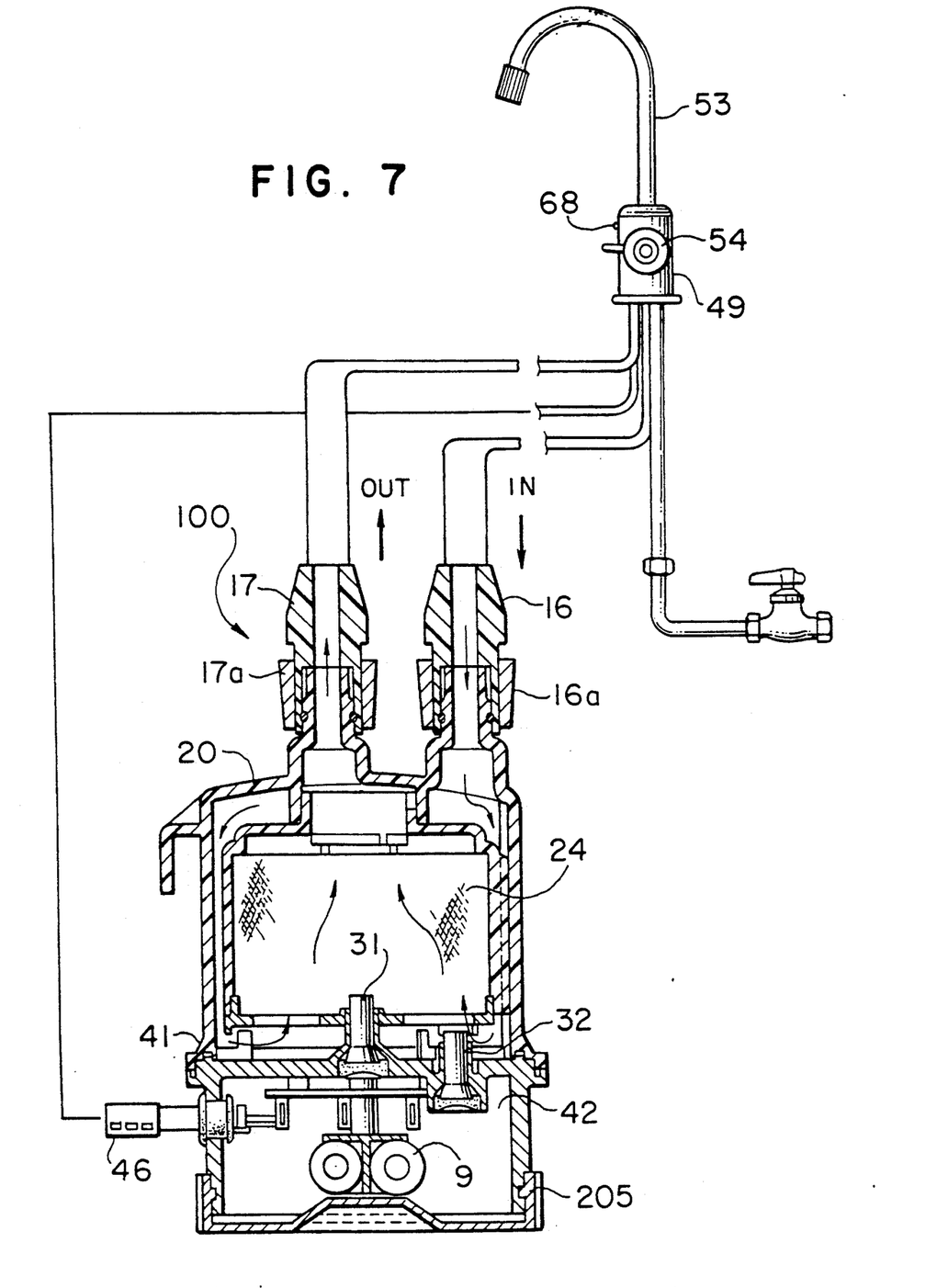
FIG. 7 is a side view, partly in cross section, which illustrates a second embodiment of the present invention.

FIG. 7 is a cross-sectional view of a water purifying apparatus 100, which illustrates a second embodiment of the present invention.

In FIG. 7, the same parts as in the first embodiment are given the same reference numerals. In the second embodiment, an unillustrated mechanical switch is disposed inside the water faucet main body 49 of the discharge pipe 53, which is a water absorption passage, in place of a ring-like float 29 as a water current sensor in the first embodiment. With this construction, the entire water purifying apparatus 100 can be miniaturized because the ring-like float 29 can be eliminated.

In the second embodiment, the filter 24 of the water purifying apparatus 100 can be replaced more easily by removing the entire water purifying apparatus 100 and replacing the entire casing 12 in which the filter is contained, since one-touch connectors 16a and 17a are formed in the entry pipe 16 and the exit pipe 17 which are formed as one unit on the casing 12 of the water purifying apparatus 100. The constructions of the water faucet main body 49, the discharge pipe 53 and the like are the same as in the first embodiment.

In addition, in the second embodiment, the entire control chamber 42 can be easily isolated from humidity since the drain passage 38 of the first embodiment is eliminated and the control chamber 42 in which the dry battery cell 9 and the control board 41 and the like are disposed is located in the lower section of the water purifying apparatus 100 and is covered with a water-vapor proof cap 205.

Next, a third embodiment of the present invention will be explained with reference to FIG. 8.

A water purifying apparatus comprises a water purifying apparatus main body 322, an active carbon fiber unit 326, and a hollow fiber membrane unit 328. The active carbon fiber unit 326 comprises a casing 334 having an inlet 330 and an outlet 332, an active carbon fiber 336 loaded into the casing 334, a dry battery cell 338 for applying a voltage to the active carbon fiber 336, a connector 339 to be connected to an external power supply, a circuit board 340, a plus electrode 342 and a minus electrode 344. Reference numeral 360 denotes a water-vapor proof cap. The hollow fiber membrane unit 328 comprises a casing 350 having an inlet 346 and an outlet 348, and hollow fiber membranes 352 loaded into the casing 350.

A coupler 354 disposed on the top end of an intake pipe 320 is releasably connected to the inlet 330 of the active carbon fiber unit 326. The coupler 354 comprises a nozzle 354a, a spool slidably engaged with the outer side of the nozzle 354a, and a ring 354c provided on the top end portion of the nozzle 354a. The top end of the nozzle 354a is outwardly fitted into the inlet 330, and the ring 354c is biased in the direction in which the diameter thereof becomes smaller. As a result, the coupler 354 is coupled to the inlet 330 in a water sealed manner. If a spool 354b is moved backward, the diameter of the ring 354c is enlarged, thus allowing the nozzle 354a to be easily pulled out of the inlet 330.

The same coupler 354 is disposed on the top end of a discharge pipe 324. One end of the discharge pipe 324 is releasably coupled to the outlet 348 of the hollow fiber membrane unit 328 in a water sealed manner by the coupler 354. The other end of the discharge pipe 324 is connected to a water faucet which is the same as the water faucet 8 of the first embodiment. The inlet 346 is coupled to the outlet 332 by being outwardly fitted thereinto.

The inlet 330, the outlet 332 and outlet 348 have the same outer diameter. The inner diameter of the nozzle 354a of the coupler 354 is equal to that of the inlet 346.

In the water purifying apparatus 322 constructed as described above, water supplies from the intake pipe 320 contacts the active carbon fiber 336, and thus odor components of chlorine or the like are removed therefrom. Then, the water is subjected to a sophisticated filtering process by the hollow yarn film 352. Thereafter, the water is sent to a discharge pipe (not shown) through the discharge pipe 324.

Incidentally, there are some areas of the world where a filtering process performed by using the hollow fiber membranes 352 is unnecessary, it being sufficient that processing by using the active carbon fiber 336 be performed because the quality of water in the water supply source is good. In such a case, the coupler 354 of the discharge pipe 324 is taken out of the outlet 348 of the hollow fiber membrane unit 328, and the inlet 346 is pulled out of the outlet 332 of the active carbon fiber unit 326. Next, the coupler 354 of the discharge pipe 324 is connected to the outlet 332. As a result, a water purifying apparatus having only the active carbon fiber 336 as a water purifying element is constructed.

Figures 8, 9:
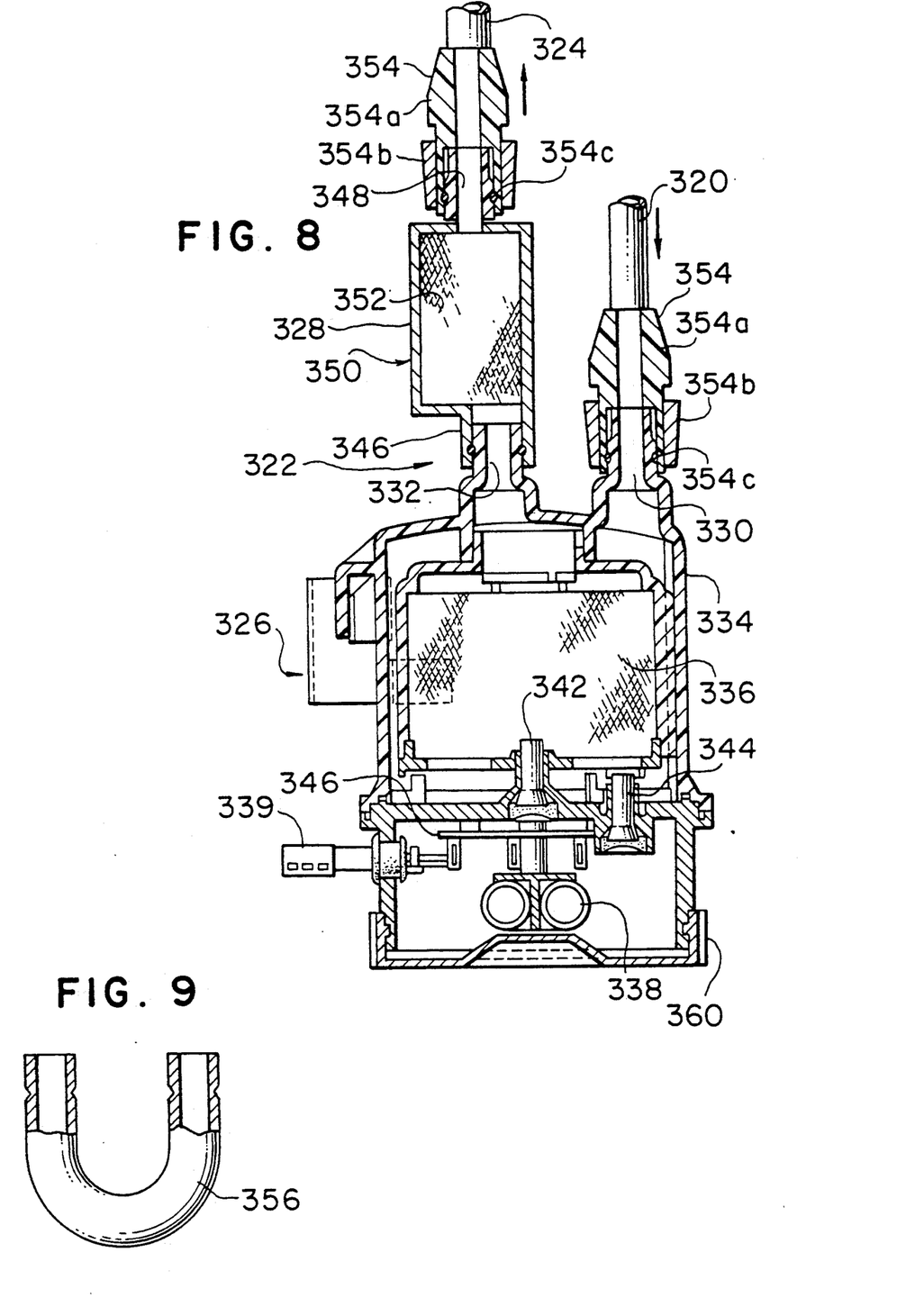
FIG. 8 is a cross-sectional view which illustrates the essential portion of a third embodiment of the present invention.
FIG. 9 is a side view, partly in cross section, of a connecting pipe used in the embodiment shown in FIG. 8.

When filtering by the active carbon fiber 336 is unnecessary in an area where the content of chlorine is low, the intake pipe 320 is directly connected to the inlet 346 of the hollow fiber membrane unit 328 by using, for example, a connecting pipe 356 shown in FIG. 9. That is, the inlet 330 of the active carbon fiber unit 326 is taken out of the coupler 354 of the discharge pipe 324, and the outlet 332 is pulled out of the inlet 346 of the hollow fiber membrane unit 328. Next, the connecting pipe 356 is connected to the inlet 346 and the coupler 354 of the discharge pipe 324. As a result, a water purifying apparatus having only the hollow fiber membranes 352 as a water purifying element is constructed.

When chlorine is always added to tap water, however, it is obvious that an ordinary water purifying apparatus should have a function for removing chlorine by using active carbon or the like. Therefore, in the present invention, it is sufficient that a selection be made between a construction in which the hollow fiber membrane unit 328 and the active carbon fiber unit 326 are both used and a construction in which only the active carbon fiber unit 326 is used.

Although in the above-described embodiment the active carbon fiber 336 is used, ordinary active carbon may be used. In the above-described embodiment, a voltage is applied to the active carbon fiber. The purpose thereof is to suppress the proliferation of coliform bacilli or general bacilli by applying a low amount of voltage to the active carbon fiber.

Although in the above-described embodiment the active carbon (active carbon fibers) and hollow fiber membranes are used as water purifying elements, it is clear that any other water purifying elements may be used in the present invention as far as they are capable of removing bacteria.

As has been explained above, the present invention can prevent the proliferation of microbes in feedwater which remains in a filter and a feedwater passage from the filter.

Many different embodiments of the present invention may be constructed without departing from the spirit and scope of the present invention. It should be understood that the present invention is not limited to the specific embodiments described in this specification. To the contrary, the present invention is intended to cover various modifications and equivalent arrangements included with the spirit and scope of the claims. The following claims are to be accorded a broad interpretation, so as to encompass all such modifications and equivalent structures and functions.

What is claimed is:

1. A water purifying apparatus, comprising:
    a purifying main body to which water to be purified is supplied;
    faucet means for discharging the water purified by said purifying main body;
    said purifying main body having:
        an inlet to which water to be purified is supplied;
        filter means located in said purifying main body disposed downstream of said inlet;
        an outlet in said water purifying main body disposed downstream of said filter means and connected to said faucet means; and
        a pair of first electrode means disposed in said filter means;
    said faucet means having:
        a faucet main body disposed downstream of said purifying main body;
        a water passage means, having an extreme end portion, disposed downstream of said faucet main body, said water passage means includes a cartridge nozzle means at the extreme end portion of said water passage means for discharging water from said faucet means; and
        a pair of second electrode means disposed in said water passage means with one electrode of said pair of second electrode means being located within said cartridge nozzle means; and
    a power supply for supplying electric current to said first and second electrode means.

2. A water purifying apparatus according to claim 1, wherein said purifying main body further comprises: a cap provided with said inlet and said outlet; a cartridge fitted to said cap and holding said filter means; a casing fitted to said cap and holding said cartridge; and a water current sensor for detecting water current in said filter means.

3. A water purifying apparatus according to claim 2, wherein said water passage means of said faucet means is formed by a discharge pipe made of an electrically conductive material and forms one of said electrodes of the second electrode means.

4. A water purifying apparatus according to claim 1, comprising a mechanical switch disposed inside of said faucet main body and operated by a water current inside of said faucet main body.

5. A water purifying apparatus according to claim 1, wherein said purifying main body includes a casing having said inlet and the outlet to each of which a coupler is formed so that said casing may be replaced.

6. A water purifying apparatus according to claim 1, wherein said filter means has an active carbon fiber unit and a hollow fiber membrane unit disposed in the downstream of said active carbon fiber unit.

7. A water purifying apparatus according to claim 6, wherein said active carbon fiber unit has a first casing having an inlet on which a first coupler is installed which is adapted to receive water to be purified and an outlet through which the purified water is discharged; active carbon fibers loaded in said first casing; and said power supply comprises means for applying a voltage to said active carbon fibers; and
    said hollow fiber membrane unit comprises a second casing having an inlet releasably coupled to said outlet of the first casing of said active carbon fiber unit and an outlet on which a second coupler is installed; and hollow fiber membranes loaded in said second casing.

* * * * *

UNITED STATES PATENT AND TRADEMARK OFFICE
CERTIFICATE OF CORRECTION

PATENT NO. : 5,324,434

DATED : June 28, 1994

INVENTOR(S) : OIKAWA, et al.

It is certified that error appears in the above-identified patent and that said Letters Patent is hereby corrected as shown below:

On the Title page:

Item [30] Foreign Application Priority Data, the incorrect date "Feb. 29, 1992" should read -- Feb. 19, 1992 --.

Signed and Sealed this

Eighth Day of November, 1994

*Attest:*

BRUCE LEHMAN

*Attesting Officer*     *Commissioner of Patents and Trademarks*